United States Patent Office 2,762,845
Patented Sept. 11, 1956

2,762,845

ALKYLATION OF AROMATIC AMINES

Rudolf Stroh, Josef Ebersberger, and Hans Haberland, Leverkusen-Bayerwerk, Germany, assignors to Farbenfabriken Bayer Aktiengesellschaft, Leverkusen, Germany, a corporation of Germany No Drawing. Application December 22, 1954,
Serial No. 477,126

Claims priority, application Germany December 24, 1953

11 Claims. (Cl. 260—578)

This invention relates to a process for the alkylation of aromatic amines with olefines.

Heretofore, there did not exist any process for producing nuclearly alkylated aromatic amines from aromatic amines and olefines.

It is an object of the present invention to provide a process for nuclearly alkylating aromatic amines with olefines. Another object is to provide a process for the production of nuclearly alkylated aromatic amines without the formation of substantial amounts of N-alkylation products. Further objects will appear hereinafter.

These objects are attained in accordance with the present invention by alkylating aromatic amines with olefines at temperatures within the range of 200°–400° C. in the presence of aluminum.

Aromatic amines which may be alkylated by the process of the invention include, inter alia, aniline, the isomeric toluidines, xylidines, naphthylamines and substitution products thereof. Among the latter, only such compounds are operative which contain at least one free hydrogen atom at the nitrogen and at the nucleus, whereas N-disubstituted amines and completely nuclearly substituted aromatic amines are inoperative.

As olefine, there may be employed ethylene, propylene, butylene, isobutylene and the higher homologues thereof. Cycloaliphatic olefines, such as cyclohexene, and aromatic olefines, such as styrene, may also be used as alkylating agents.

The catalyst, aluminum, may be employed in any suitable form. Thus, aluminum may be added in form of metallic aluminum or in form of an aluminum alloy. Aluminum compounds, such as aluminum-triethyl, and mixtures of aluminum with metal compounds, such as an aluminum-mercuric chloride mixture, which under the reaction conditions will decompose to form metallic aluminum or an aluminum alloy are likewise suitable. In general, 1–2% by weight of aluminum, based on the amount of the aromatic amine to be alkylated, will suffice to bring about the catalytical action, although higher catalyst concentrations may be used, if desired.

In carrying out the process of the invention, the aromatic amine to be alkylated is mixed with the catalyst and the mixture is heated to the alkylation temperature, say about 300°–350° C. Upon completion of the hydrogen evolution, caused by the reaction of the aromatic amine with the catalyst to form the corresponding aluminum anilide, the olefine is added. In case a gaseous olefine, such as ethylene and propylene, is used, it is advantageous to introduce such an amount of the same as to reach a pressure of about 50–300 atmospheres. The reacting mixture is then kept at the alkylation temperature until the desired quantity of olefine has been adsorbed. When operating continuously, the aromatic amine containing the catalyst and the olefine may be pumped through a heated pressure tube at such a rate as to bring about a substantial conversion of the reactants. The reaction product is isolated from the reaction mixture by steam distillation and/or distillation in vacuo.

The process of the invention results in the formation of nuclearly substituted aromatic amines. Thus, aniline and ethylene react to form 2-ethylaniline and 2,6-diethylaniline depending upon the amount of ethylene used and the alkylation temperature.

The alkylated aromatic amines obtainable by the process of the invention are valuable intermediates for use in the production of dyestuffs, pharmaceuticals and insecticides.

The invention is further illustrated, but not restricted by the following examples, the parts mentioned being by weight.

Example 1

300 parts of redistilled aniline, 7.5 parts of granulated aluminum, and 0.3 part of mercuric chloride are heated in an autoclave for 3 hours to 200° C. after sweeping the air from the reactor with ethylene. The hydrogen evolved is vented. The temperature is then raised to 300° C. while introducing ethylene to a pressure of 170 atmospheres. The ethylene is rapidly absorbed. After 6 hours, the ethylene absorption amounts to about 170 parts, which corresponds to 2 mols of ethylene per 1 mol of aniline. The reaction mixture is worked up by steam distillation, a small resinous residue remaining in the still. The steam distillate is extracted with benzene. Upon distilling off the latter, 423 parts of a slightly yellowish oil is obtained which is subsequently fractionated. The main fraction (377.7 parts) is 2,6-diethylaniline, boiling at 240°–244° C.

Example 2

200 parts of o-toluidine, 10 parts of aluminum powder, and 1 part of mercuric chloride are heated in an autoclave in the absence of air for 3 hours to 200° C. whereby aluminum toluidide is formed. Upon venting the hydrogen evolved, the temperature is raised to 325° C. while introducing ethylene to a pressure of about 190 atmospheres. The reaction immediately sets in as shown by a rise in temperature, which is controlled by proper adjustment of the heating. After 3 hours, 50 parts of ethylene is absorbed, which corresponds to 1 mol of ethylene per 1 mol of toluidine. The reaction mixture is worked up as described in Example 1, whereby ethyl toluidine is obtained.

Example 3

100 parts of aniline, 5 parts of aluminum chips, and 0.3 part of mercuric chloride are heated for 3 hours to 200° C. as described in Example 1. Then propylene is introduced to a pressure of about 200 atmospheres while raising the temperature to 300°–350° C. 100 parts of propylene are absorbed, which corresponds to 1 mol of propylene per 1 mol of aniline. The reaction mixture is worked up by distillation to obtain propyl aniline.

Example 4

300 parts of m-toluidine, 6 parts of aluminum powder, and 0.3 part of mercuric chloride are heated in the absence of air in an autoclave for 3 hours to 200° C. Upon venting the hydrogen evolved the temperature is raised to about 340°–350° C. while introducing ethylene to a pressure of about 200 atmospheres. After 3½ hours the ethylene absorption is complete, the increase in weight being 151 parts, which corresponds to 2 mols of ethylene per 1 mol of m-toluidine. The reaction mixture is worked up by distillation. Thus, diethyl-m-toluidine boiling at 112°–114° C./3.5 mm. is obtained in a yield of 83%. The acetylation product melts at 153°–154° C.

Analysis of the acetylation product $(C_2H_5)_2(CH_3)C_6H_2NH.COCH_3$

Calculated: 76.10% C; 9.27% H; 6.83% N.
Found: 76.15% C; 9.25% H; 6.74% N.

Example 5

Following the procedure of Example 4, 2,6-diethyl-4-methylaniline boiling at 113°–115° C./4.5 mm. is obtained from p-toluidine and ethylene. The acetylation product melts at 167° C., which is in good accordance with literature data.

Example 6

320 parts of sym. m-xylidine and 5 parts of aluminum powder are heated to 330°–360° C. while introducing ethylene to a pressure of about 200 atmospheres. The ethylene absorption is complete after 3 hours, the increase in weight being 142 parts. This corresponds to 2 mols of ethylene per 1 mol of sym. m-xylidine. The reaction product boils at 96°–98° C./0.8 mm. and has a solidification point of 47° C. Acetylation yields an acetylation product melting at 194° C.

Example 7

Following the procedure of Example 6, 6-ethyl-2,4-dimethylaniline is obtained from 1 mol of asym. m-xylidine and 1 mol of ethylene. The product boils at 102°–104° C./3.5 mm.

Analysis of the acetylation product $C_{10}H_{15}N$:
 Calculated: 80.54% C; 10.07% H; 9.40% N.
 Found:      80.65% C; 10.28% H; 9.10% N.

The acetylation product obtained therefrom melts at 156° C. upon recrystallization from dilute alcohol (needles).

Example 8

8000 parts of aniline and 140 parts of granulated aluminum are heated in an autoclave to about 300° C., whereby aluminum anilide is formed with evolution of hydrogen. Since the latter does not interfere with the reaction, it need not be vented. Then ethylene is introduced to a pressure of about 150–200 atmospheres while maintaining the temperature at about 300°–350° C. The reaction sets in almost immediately. If the reaction is discontinued upon absorption of 1 mol of ethylene per 1 mol of aniline, a mixture containing 30% of unreacted aniline, 39% of 2-ethylaniline and 25% of 2,6-diethylaniline is obtained, the balance being higher alkylated anilines. This corresponds to a yield of 55.7% of 2-ethylaniline and 35.7% of 2,6-diethylaniline, based on reacted aniline.

By varying the amount of ethylene used in the reaction, either 2-ethylaniline or 2,6-diethylaniline is obtained as the main product. Thus, if 0.3 mol of ethylene is allowed to react with 1 mol of aniline, 20% of 2-ethylaniline and 6% of 2,6-diethylaniline are formed, the balance being unreacted aniline. If, on the other hand, 1.5 mol of ethylene is allowed to react with 1 mol of aniline, 29% of 2-ethylaniline and 49% of 2,6-diethylaniline are formed, the balance being unreacted aniline. The yield of 2-ethylaniline and 2,6-diethylaniline, based on reacted aniline, amounts to 71.5% and 32.9%, respectively, in the first case and to 21.5% and 55.6%, respectively, in the second case.

The 2-ethylaniline boils at 78°–80° C./5 mm. and yields an acetylation product melting at 114°–116° C., which is in good accordance with literature data. The benzoyl compound melts at 153°–154° C.

The ethylene pressure in the ethylation may be varied within wide limits. By lowering the pressure, the reaction time is correspondingly lengthened. Thus, half-ethylation (1 mol of ethylene per 1 mol of aniline) requires 40 minutes at a pressure of 150–180 atmospheres and 2½ hours at a pressure of 60–80 atmospheres.

What is claimed is:

1. Process for the alkylation of aromatic amines, which comprises heating an aromatic amine with an olefine at a temperature within the range of 200°–400° C. in the presence of aluminum.

2. Process in accordance with claim 1, in which aluminum is used in the form of metallic aluminum.

3. Process in accordance with claim 1, in which aluminum is used in the form of an aluminum alloy.

4. Process in accordance with claim 1, in which aluminum is used in the form of an aluminum compound decomposing under the reaction conditions to form metallic aluminum.

5. Process in accordance with claim 1, in which aluminum is used in the form of a mixture of aluminum with a metal compound, which mixture will decompose under the reaction conditions to form an aluminum alloy.

6. Process for the alkylation of aromatic amines, which comprises heating an aromatic amine and a gaseous olefine at a temperature within the range of 200°–400° C. and at a pressure of about 50–300 atmospheres in the presence of aluminum.

7. Process in accordance with claim 6, in which aluminum is used in the form of metallic aluminum.

8. Process in accordance with claim 6, in which aluminum is used in the form of an aluminum alloy.

9. Process in accordance with claim 6, in which aluminum is used in the form of an aluminum compound decomposing under the reaction conditions to form metallic aluminum.

10. Process in accordance with claim 6, in which aluminum is used in the form of a mixture of aluminum with a metal compound, which mixture will decompose under the reaction conditions to form an aluminum alloy.

11. Process in accordance with claim 6, in which aluminum is present in an amount of 1–2% by weight, based on the amount of said aromatic amine.

References Cited in the file of this patent

UNITED STATES PATENTS 2,448,160    Thomas et al. _____ Aug. 31, 1948

OTHER REFERENCES

Alkylation of Aromatics, Chem. Abst., vol. 43, col. 680 (1949).

K. Lavrovskii et al.: Doklady Akad. Nauk S. S. S. R., Catalytic Alkylation of Aniline with n-Butene, Chem. Abst., vol. 43, col. 4644 (1949).